April 21, 1970  C. W. MacCOY  3,508,042
LIGHTING CONTROL DEVICE
Filed July 10, 1968

Inventor:
Clifford Walter MacCoy

United States Patent Office 3,508,042
Patented Apr. 21, 1970

3,508,042
LIGHTING CONTROL DEVICE
Clifford Walter MacCoy, 542 Meadoway Park,
Worthington, Ohio 43085
Continuation-in-part of application Ser. No. 404,873,
Oct. 19, 1964. This application July 10, 1968, Ser.
No. 751,658
Int. Cl. F21s 1/14, 3/14
U.S. Cl. 240—9                    9 Claims

ABSTRACT OF THE DISCLOSURE

A device for controlling the illumination of an enclosed area by regulating the direction of incidence and reflectivity of the incoming light. Specifically, a grid panel has each of its louvers tilted at an angle along its vertical plane and wherein the surface of louvers is nonlinear with respect to the incident rays to cause the light to emanate therefrom in a given direction. The panel further comprises a plurality of sections with each of the louvers in a given section, relative to another section, oriented parallel with, or at a different angle along the horizontal axes to direct the projected light in a predetermined pattern.

CROSS REFERENCES

This application is a continuation-in-part of my co-pending application, Ser. No. 404,873, filed Oct. 19, 1964, now abandoned.

BACKGROUND

The prior art is replete with grid panels or screens that attempt, in one way or another, to regulate the illumination of an area. In most instances these devices are the so-called "light softeners" and function by diffusing the light—but, more accurately, by merely reducing the amount of light. The prior art devices, however, do not actually "control" the illumination of light by shielding in an area. That is, control is lacking to either project the illumination toward or away from a direction, or to distribute the illumination in a controlled manner over the area.

SUMMARY OF THE INVENTION

The present invention comprises a grid panel made up of a plurality of sections. The panel is intended to cover the entire ceiling of the enclosed area and regulates the direction of incidence and reflectivity of the light from a plurality of light sources dispersed over the ceiling. The panel is made up of a plurality of sections that comprise in themselves a plurality of light louvers. All of the louvers in a given section are tilted, and are either straight, bent or curved at an angle along their tilted (vertical) axes. The louvers that comprise a given section are also oriented parallel with or turned to a different angle along their horizontal axes relative to the other sections. In this way a continuous series of uniformly distributed light pipes are utilized to illuminate the area in a given manner and of equal importance to direct substantially all of the light to (a) selected direction(s).

The lighting control panel of the present invention finds particular application in rooms where it is intended that each of its occupants faces a given direction, such as, an industrial drafting room. In such an application, it is desired that each of the occupants over the entire room receive maximum lighting and, of equal importance, that there be no light directed or reflected towards the eyes of the occupant.

OBJECTS

It is accordingly a principal object of the present invention to provide a light panel for controlling the illumination of an enclosed area.

It is a further object of the present invention to provide a light panel that regulates the directions of incidence and reflectivity of the incoming light in an enclosed area.

Another object of the present invention is to provide a light panel that regulates the distribution of light and simultaneously directs the light in a given direction over an entire enclosed area.

Further and other objects will become apparent from the following detailed description when taken in conjunction with the drawings in which:

DETAILED DESCRIPTION OF THE INVENTION

Figure 1:
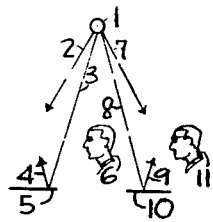
FIGURE 1 is a pictorial illustration of light reflection in an area where the occupants face a single direction.

Referring now to FIGURE 1 there is shown a pictorial illustration of a conventional room illumination. As can be seen at an exact midpoint, i.e., 90°, the light rays emanating from source 1 will be reflected from the work surface directly upwardly; whereas rays represented by 2 and 3—beyond the 90° midpoint—will be reflected from the work surface 5 away from occupants 6 and 11; and whereas rays represented by 7 and 8 will be reflected from the work surface 10 toward the occupant. Therefore, in a simple case for normal working conditions rays 2 and 3 are ideal as they would be both directed and reflected away from the eyes of the occupant and rays 7 and 8 would be objectionable since they would be both directed and reflected toward the eyes of the occupant. The light ray pattern in FIGURE 1 typifies the spread from many conventional lenses, waffles, louvers, eggcrates, prisms and polarized devices.

Figure 2:
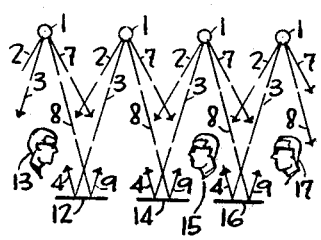
FIGURE 2 is a pictorial illustration of light reflection in an area where the occupants face in two directions.

In FIGURE 2 a continuous row of light sources 1, 1a, 1b and 1n are shown with light rays represented by 2, 3, 7, and 8 traveling from each. In this arrangement the occupants 13, 15, 17, in different locations and facing in different directions, are confronted with having the direct and reflected light in their eyes. This condition exists even though the light rays 2, 3, 7, and 8, are all below the 45° cutoff line of the conventional eggcrate.

Figure 3:
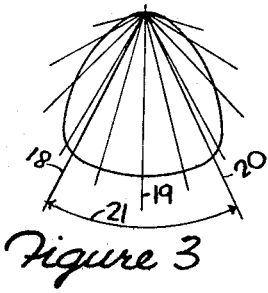
FIGURE 3 shows the approximate spread of light from a light source with the greater distances out from the source as the measure of greater intensity.

In order that the invention may be understood, reference is made to FIGURE 3 which represents an average or approximate limit for the spread of light of maximum intensity from a light source. It is the light within the arc 21, defined by light rays 18 and 20 that is of primary importance for controlled illumination of an enclosed area.

Figure 4:
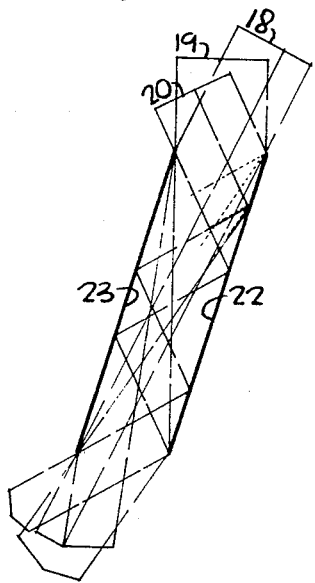
FIGURE 4 is a schematic illustration of the light reflection from a pair of parallel surfaces and wherein the surfaces are tilted.
Figure 5:
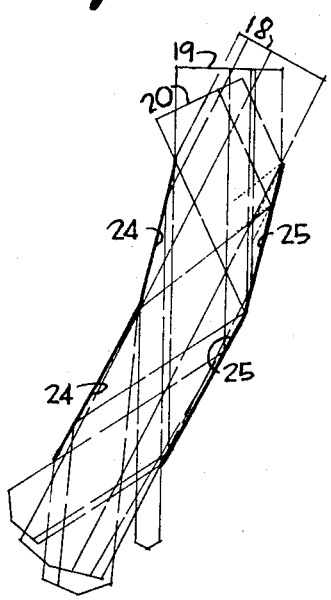
FIGURE 5 is a schematic illustration of the light reflection from a pair of parallel surfaces and wherein the surfaces are bent at a mid section.
Figure 6:
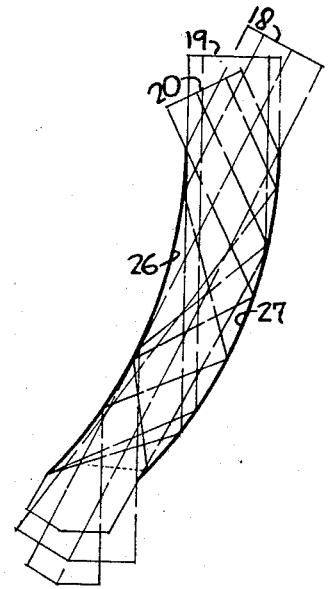
FIGURE 6 is a schematic illustration of the light reflection from a pair of parallel surfaces and wherein the surfaces are curved.

Referring to FIGURES 4, 5, 6, there is shown alternative embodiments of the light projection control of the present invention. In each embodiment a pair of light reflecting surfaces or louvers form essentially a light pipe or tube from the light source for projecting the light's rays in a controlled direction. Rays 18, 19, 20 are shown in FIGURES 4, 5, 6, as being indicative of the widest directions of the strongest light rays coming from a number of light sources in various locations on that side of the device.

Specifically, in FIGURE 4 there is shown reflective surfaces 22 and 23 as being in single, parallel planes, slanted or inclined from the light source and in the direction desired. The paths of the light rays entering the space between the reflecting surfaces form bands parallel to the light rays 18, 19, 20. All three bands of light emanate (as shown in the lowermost portion of FIGURE 4) in forward directions, that is, away from plane A. The tip of surface 22 has been made dull (not black) so that the light from this part of band 20 does not proceed rearward toward the viewer. The dotted lines indicate the direction of these rays had they been reflected.

In the first alternative embodiment of FIGURE 5 the reflective surfaces 24 and 25 are generally similar to FIGURE 4, except that the lower portion of each surface is slanted further near the midpoint creating a bent surface. Also, in this embodiment the space between 24 and 25 is wider. All three bands of light, 18, 19, 20, emanate away from plane A in forward directions—although the projected light patterns differ from those in FIGURE 4. The upper tip of surface 25 also has been dulled to control part of light band 20 from emanating in a rearward direction.

In the second alternative embodiment of FIGURE 6 reflective surfaces 26 and 27 are curved as well as slanted or inclined together with the spacing between surface adjusted. All three light bands parallel to the incoming light rays 18, 19, 20, emanate in a forward direction away from plane A but again in a light pattern that differs from either those of FIGURES 4 or 5. In this embodiment too the lower tip of surface 27 is dulled to control a portion of band 20 from emanating rearward.

In a given area to be illuminated there is generally provided a plurality of light sources dispersed, in most instances, evenly—at least over the central-most portion of the ceiling. Accordingly, to direct the light to a single given direction would result in bright and shadow spots. This would be especially true on the edges and corners of the area—but such spots or portions may occur anywhere in the room. The size and configuration of the area taken in conjunction with the number and types of light sources would dictate the bright and dull light portions. The nature of the room or area may also dictate the lighting, for instance, an exhibition space may require lighting from the ceiling to be projected on several different walls where exhibits are displayed. The embodiments of FIGURES 4, 5, 6, are a pair of reflecting surfaces or in other words a single light pipe wherein its light from a single or a plurality of light sources is directed to a given direction. Accordingly, to provide a grid type structure of the light reflecting surfaces of FIGURES 4, 5, 6, would result in a room that is illuminated by light projected in a given direction. However, if the grid structure were made up of uniformly directed reflecting surfaces, the above-mentioned dull and bright spots would not occur.

Figure 7:
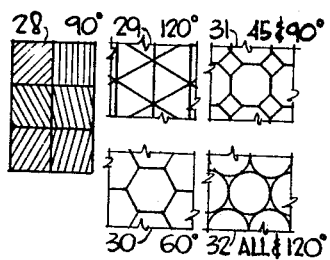
FIGURE 7 illustrates the bottom view of several panels comprised of sections having—in addition to the tilted, bent, or curved louvers—a configuration to form various light patterns and/or to provide various adjustments in the direction of the controlled light.

With reference to FIGURE 7 there are shown several panels 28, 29, 30, 31, 32, made up of sections or units of reflecting surfaces as those shown in either FIGURES 4, 5, 6. These panels are typical for achieving light patterns of various shapes, each with an increment of turn possible in degrees as noted above, to achieve adjustment in the direction of forward light for a special area. With these panels, light enhancement is achieved over specific portions of an area with a choice of patterns, sizes and colors while the principle of forward or directed light is maintained.

In each of the panels of FIGURE 7 the individual sections of reflecting surfaces are oriented in a different direction to thereby project the light in a given direction. In this way the individual sections making up a panel may be oriented throughout a given room to project the light with equal illumination to individual desks or tables dispersed throughout the room. Or in another arrangement, the sections may be oriented to project the light on several different walls where exhibits are displayed. It can be appreciated therefore that any enclosed area of any configuration and for various purposes can be illuminated in an optimum manner. In some instances for uniqueness the light sources may be of the three basic colors and by projecting the light the walls or other portions of the room may be illuminated with light of any color in the spectrum. It is not intended that these control units be limited to overhead surfaces, however. In certain cases units or sections below eye level, for example, auto headlights might direct the light down, and units above eye level might direct the light up. Also shown in 28 of FIGURE 7 are some of the variations possible in the directions of the principal reflective members within each section. It is intended that these control units may be located anywhere that is appropriate: above, at the sides, below, and either as an integral part of the enclosure of a space, or as separate areas, or as covers for individual light reflectors. The reflective surfaces may be on louvers, eggcrates, honeycombs, or coated laminations of transparent glass or plastic. The surfaces, as pointed out above, are inclined surfaces and apertures, which may be flat, bent, or curved in section, and which direct substantially all of the light forward of plane A. In most cases, it is intended that there will be no lateral control of light within and along the length of the louvers so that the resulting lateral spread of light diffuses any shadows caused by its forward direction, such as from a person onto a work surface in front of him. The adjustments possible by means illustrated in FIGURE 7 also are of value in this respect. The pasage of air and sound may be done through the spaces between the reflective surfaces. In the type illustrated in FIGURE 8, where the unit is enclosed in a jacket or envelope, and in FIGURE 9, where the spaces between the louvers are filled with clear plastic or glass, the passage of air and sound would have to be through openings in the supporting frame. Such an expediency is done with acoustic tile systems, or alternatively, the units could be spaced apart, with intervening units of matching louvers, but with open spaces between them to permit both the passage of air and sound and to provide continuity of the light control louver pattern.

Figure 8:
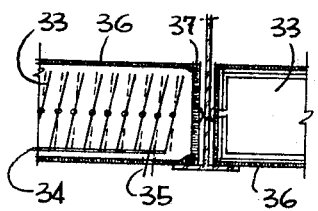
FIGURE 8 is a cross-sectional view of one of the sections of the panels shown in FIGURE 7; and, FIGURE 9 is a partial sectional view of one of the sections wherein the spaces between the reflective surfaces are filled with transparent material.

In FIGURE 8 the louvers are shown in section 33, pivoted to a limited extent, and mounted in a transparent plastic or glass jacket or envelope 36, with a capped end 37, for accessibility for cleaning; also shown is a control bar 34, and knob 35, to permit adjustment. The top surface of such an envelope would be etched to increase the acceptance of source light.

In addition, FIGURE 8 shows a typical means of support. The construction of a typical section is made by continuing the number and length of the reflective members to the desired area and shape, as suggested in FIGURE 7. The louvers are secured in position by interlocking cross members or ties, by setting in a peripheral frame, or in the case of laminations, by fusion, adhesion or mechanical ties, or as shown in FIGURE 8, by placing the section in a transparent envelope of glass or plastic.

The supports for these units depends somewhat on where they are installed, and the pattern of units selected. In the case of a typical ceiling, the units could be supported or exposed or concealed continuous runners, if the pattern of joints between units ran in straight lines. The exposed runner could be the conventional inverted "T," with the units simply laid on the outstanding flanges of this "T," similar to the conventional "lay-in" system for acoustic tile. This provides easy access for relamping, cleaning, and for lifting and turning the units, or substituting others with different horizontally oriented louvers as shown in FIG. 7, 28, for special directions of light. The exposed part of the "T" could be of any desired profile. These runners would be suspended by hangers at regular intervals, from any available structural frame above, such as floor beams, with the lights and their reflectors between this floor and the suspended plane of these units. The runners could also be concealed by placing them above the units, and thus presenting a different appearance from below. In this case, the units could be secured to the runners by clips, or by screws, also concealed, which would also permit removal. Clips, or screws may be located in spots to permit their continued function when the units, or some of them, were turned. This most likely would be at the corners, where the contiguous units would converge to a "key" point. Where the pattern of joints between units is not in straight lines, such as FIGURES 7, 30, 31, and 32, hanger rods from the structural elements, with bottom ends fitted with nuts to which the clips are secured, could be placed in straight rows (since the patterns shown are repetitive) with the clips engaging at least three key points or corners of each unit, which would be equipped with a mating groove or bead to engage the clips. Thus, for example, the same pattern of clips used for the equilateral pattern of 29 (FIGURE 7) could also be used for 32, and the increment of turn noted for each would be accommodated. The circular pattern 32, adjustable to all degrees, would have a circular frame with a continuous groove or bead, to engage the three clips in any position to which the unit might be turned. In the case of the units being applied to walls, the clips, or runners—either exposed or concealed—would be secured to furring members of adequate strength. In all cases, the suspension hangers or furring members would clear the light source and its reflectors, if they were used, and would be so located that any shadows on the units would be diffused beyond recognition.

Figure 9:
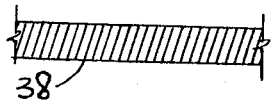

FIGURE 9 shows, in 38, the reflective surfaces of type 22 and 23 of FIGURE 4, in this case set in clear glass or plastic. These surfaces could either be thin, reflective metal, or they could be equally reflective material, such as specular aluminum, painted on the side of each strip of glass or plastic, with any number of these strips secured together, by adhesion, by fusion, or by mechanical ties, to make up the desired unit. This method is also applicable to the reflective surfaces 24 and 25, and to 26 and 27, shown in FIGURES 5 and 6, respectively. The top surface in FIGURE 9 would also be etched to increase its acceptance of source light.

What is claimed is:
1. A light control panel support adjacent a light source for projecting all of the light projecting therefrom in a controlled direction comprising a plurality of interconnected sections of parallel light louvers positioned slanted at an angle with the perpendicular to the plane of the unit, to define a series of reflecting surfaces, each of said slanted louvers causing said light reflected therefrom to project forwardly bands of light in said controlled direction, said light projected on the forward side of said louvers and traveling away from a plane normal to the surface of said louvers and further aligned with the bottom edge of the rearmost louver in said section, said forward projection directly related to said angle of said slant said louvers comprising said sections oriented along their horizontal axes to direct said forwardly projected light, and wherein said orientation of any one of said sections is independent of the orientation of that of said other sections to direct said forwardly projected light in a predetermined pattern.

2. A light control panel as set forth in claim 1 wherein said slanted louvers further comprise a nonlinear surface, and wherein the spacing between said louvers is positioned to achieve a predetermined projection pattern.

3. A light control panel as set forth in claim 2 wherein said nonlinear surface further comprises a bend in said louvers.

4. A light control panel as set forth in claim 2 wherein said nonlinear surface further comprises a curve in said louvers.

5. A light control panel as set forth in claim 1 wherein said sections are each of a similar structure.

6. A light control panel as set forth in claim 1 wherein said sections are each of a dissimilar structure.

7. A light control panel as set forth in claim 1 wherein said sections are each a box-like structure.

8. A light control panel as set forth in claim 1 wherein the spacing intermediate said louvers is filled with a transparent material.

9. A light control panel as set forth in claim 1 wherein said interconnected sections further comprises an air and sound passage intermediate said sections at said interconnection.

References Cited

UNITED STATES PATENTS

| | | | |
|---|---|---|---|
| 1,900,436 | 3/1933 | Dourgnon | 240—46.4 XR |
| 2,837,632 | 6/1958 | Lipscomb. | |
| 2,859,334 | 11/1958 | Guth | 240—9 XR |
| 3,220,065 | 11/1965 | Graham | 240—78 XR |
| 3,409,766 | 11/1968 | Meckler | 240—9 XR |

FOREIGN PATENTS 648,159   12/1950   Great Britain.

JOHN M. HORAN, Primary Examiner

J. F. PETERS, Jr., Assistant Examiner

U.S. Cl. X.R.

240—78, 93